Feb. 8, 1927.
P. H. THOMAS
1,616,931
TRANSMISSION TOWER FOR ELECTRIC CIRCUITS
Filed Oct. 10, 1925    2 Sheets-Sheet 1
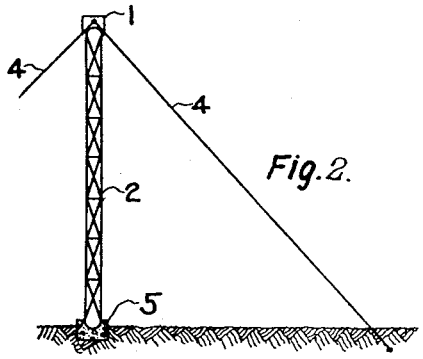
Fig. 1.
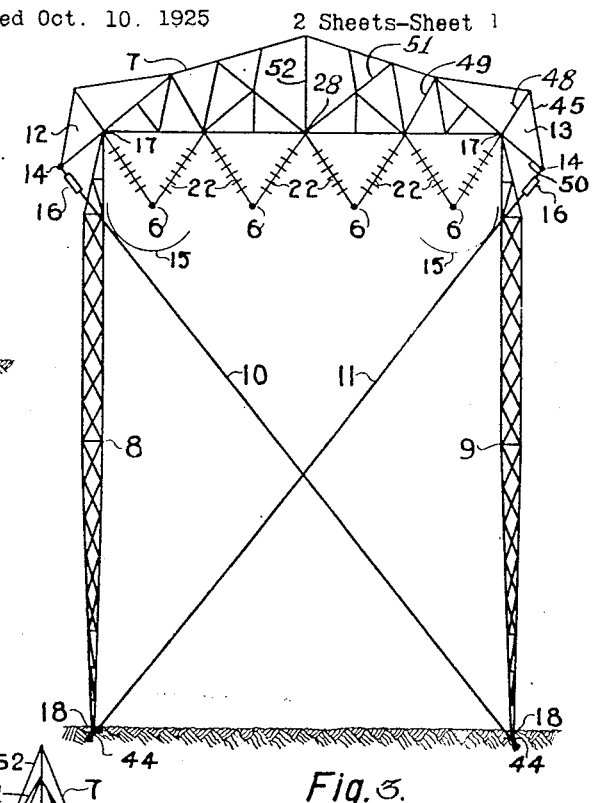
Fig. 3.
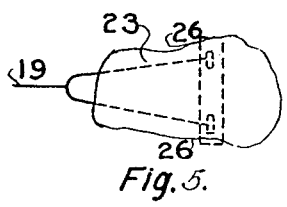
Fig. 2.
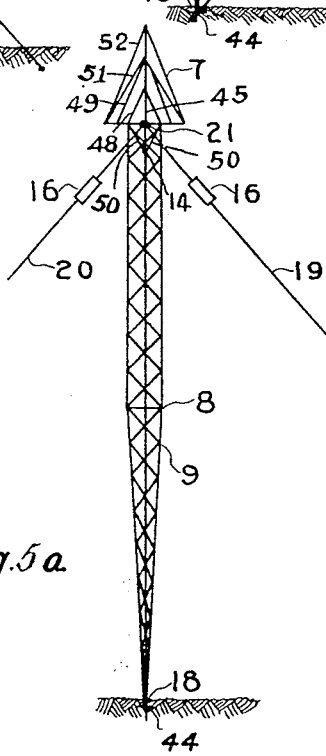
Fig. 4.
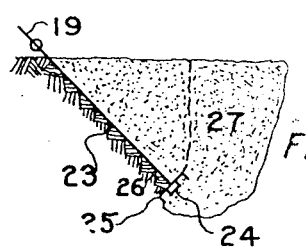
Fig. 5.
Fig. 5a.
WITNESSES
J. D. Holmer
Harold A. W. Cano
INVENTOR
Percy H. Thomas Patented Feb. 8, 1927.

1,616,931

UNITED STATES PATENT OFFICE.

PERCY H. THOMAS, OF UPPER MONTCLAIR, NEW JERSEY.

TRANSMISSION TOWER FOR ELECTRIC CIRCUITS.

Application filed October 10, 1925. Serial No. 61,752.

My invention relates to supporting structures for electric transmission lines and more particularly for long lines for transmitting electric power. It is well known that such transmission lines are subjected to considerable mechanical stresses of various sorts in actual service, so that the supporting structures must resist stresses in addition to carrying the weight of the conductors.

Such stresses may be due to the component of the wind across the line, or to the formation of ice on the conductor or the lodging of snow. Furthermore, in case of a broken conductor a considerable stress may be brought on adjacent supporting structures, or "towers" as they are usually called on important lines when made of steel. When line conductors are large and are drawn very tight to keep them high above the ground the longitudinal pull upon a tower may be very considerable when a conductor breaks on one side of the tower.

As the transmission art has developed these towers when for important lines are made very heavy and costly to meet these requirements. They are usually of the rigid type frame of light steel members and placed upon foundations buried deep in the ground so that they will not be pulled up and the towers overturned in case of excessive stresses.

Such towers range from 50 feet to over 100 feet in height and usually have narrow bases, perhaps one third to one fourth of their height. The result is that horizontal forces due to various causes, for example, wind pressure or to broken wires applied near the top of the tower cause vertical stresses, upward in some of the tower legs and downward in other tower legs, several times as great as the exciting horizontal stresses.

It is the purpose of my invention to provide a tower which shall be lighter and less costly than the present type of tower. It has a number of other important advantages.

Figure 6:
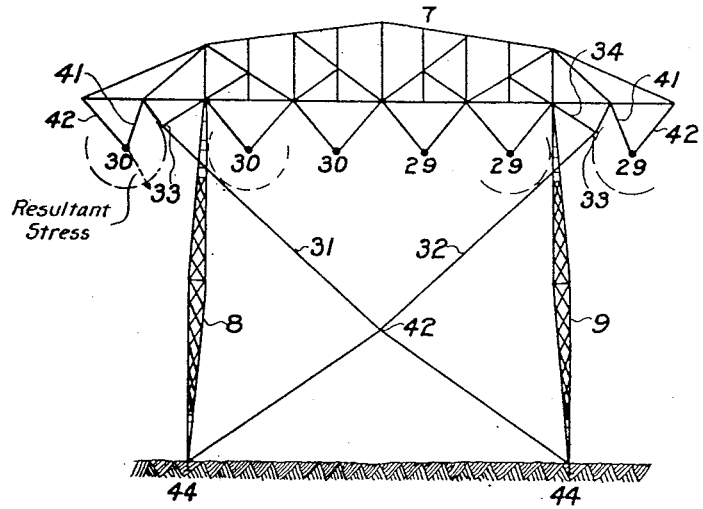
Figure 6A:
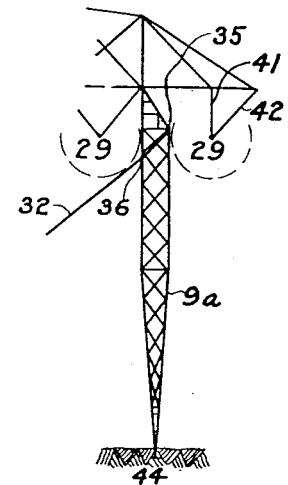
Figure 7:
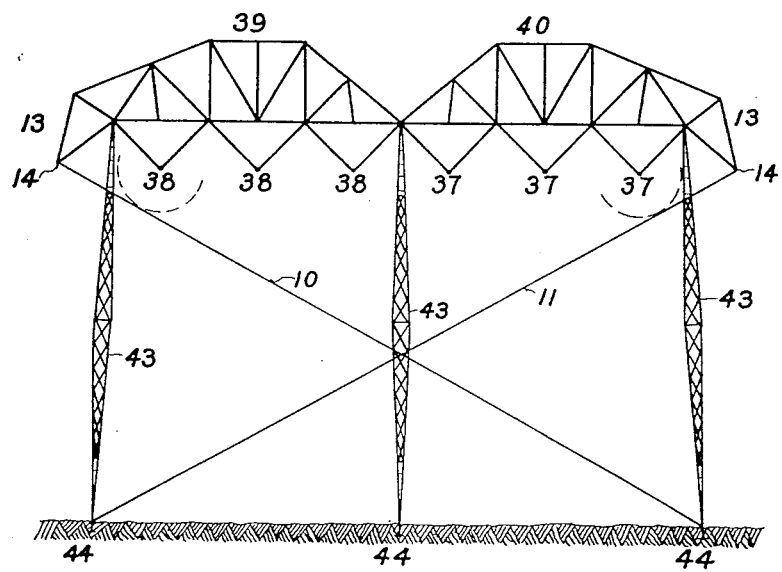

In Figs. 1 and 2, I have shown my new tower in simplified diagrammatic form. Fig. 1 is an elevation of a tower looking along the direction of the line, the insulators and conductors and the longitudinal guys having been omitted from this figure for the sake of simplicity. Fig. 2 is an end elevation of the tower as shown in Fig. 1, looking across the line, the transverse guys being omitted in this figure. Figs. 3 and 4 show a more complete embodiment, Fig. 3 being an elevation looking along the line in either direction and Fig. 4 being a side elevation of the tower of Fig. 3 looking across the line toward post 9. For the sake of clearness the longitudinal guys in Fig. 3 and the insulators, conductors, the turnbuckles in the transverse guys and certain structural members in the crossarm in Fig. 4 are omitted. Figs. 5 and 5ª are respectively a plan and a vertical section showing one form of guy anchor. Fig. 6, is an elevation looking along the line of a modified tower adapted to carry two circuits, the longitudinal guys being omitted. Fig. 6ª shows an elevation, looking along the line of a modified arrangement of the post and transverse guy of Fig. 6. Fig. 7 is an elevation looking along the line of a modification of the tower of Fig. 6, showing three posts and a sectionalized crossarm, the longitudinal guys being omitted.

In Fig. 1—1 is a rigid crossarm or horizontal supporting member for carrying transmission line conductors,—2, 2, are rigid posts to support the crossarm 1, and 3ª, 3ᵇ, are guys holding the posts against movement to the right or to the left. The transmission wires would run perpendicular to the plane of the paper in Fig. 1. In Fig. 2 the same structure is shown in a view at right angles to that of Fig. 1, the line conductors, not shown, naturally lying parallel to the plane of the paper. 4, 4, are guys usually preferably attached to the crossarm at the tops of the posts 2, 2, as shown, although the guy may be connected at the top of the pole in which case the shear must be taken up by the connection at the top of the pole. The crossarm of Fig. 1 is again shown at 1.

In Figs. 1 and 2, both ends of the posts are shown as fastened to the crossarm 1 and to the foundations 5, 5, in such a manner as to be able to take angular motion freely, they may be spoken of as "hinged" in this sense although the angular motion is free in all directions.

This freedom of motion serves an important function, for if the posts were rigidly attached to the crossarm 1 or the foundations 5, as by riveted or bolted steel members, any slight motion of the crossarm 1 due to wind or broken wires would throw a heavy bending stress on the posts 2, 2. The point of attachment of the guys at the top of the posts is also such that no bending moment is developed in the posts. If, as here shown, dependence is placed upon guys, it is not feasible to secure entire fixedness of position in the crossarm 1, 1, so that with rigid connections between the crossarm 1 and the posts 2, 2, and the foundations 5, 5, it would be necessary to design the posts strong enough to withstand bending stresses due to longitudinal movement of the crossarm which would render them so costly as to be useless from the point of view of this invention. I thus take advantage of the fact that a long post, subjected only to axial loading, may be designed very much lighter than one which must also carry bending or deflecting moment.

Referring to Fig. 1, it will be seen that any pull along the crossarm 1 to the right will be taken up by a tension in the guy 3ᵃ running upward and to the right and vice versa, there being produced at the same time a push downward on the post 2, but no bending moment. Similarly with a pull to the left and the other guy 3ᵇ. A pull at right angles to the cross arm, as to the right in Fig. 2 will be taken up by a tension in the left hand guy 4 and will produce a downward pull in the post 2 but no bending. A downward pull such as dead weight will, of course, be divided between the two posts according to the location of the load, but no bending will be produced.

Furthermore, it is evident that should a stretching occur in any of the guys, allowing a certain motion in the crossarm 1 no strain will be put on the posts 2 since they are free for angular motion at their ends.

Now, comparing Figs. 1 and 2 with the prior art tower, it is seen that the maximum stress in the various members of Figs. 1 and 2 will be much less than those in the tower of the prior art, on account of the multiplying of force due to the leverage against the foundations in the prior art tower and that, while the prior art tower must be designed to take a heavy bending stress, no bending stress occurs in the structure of Figs. 1 and 2.

When an actual guyed post tower is to be constructed some other considerations must be taken into account. For example, a large space or clearance must be left around all the conductors for the purposes of insulation and since the guys will naturally run near to the position where the insulators can be most economically located, some means must be used to secure the necessary insulation clearance.

I show in Fig. 3, a construction well suited to this purpose. In this figure, the conductors are shown at 6, 6, the crossarm is shown at 7, in this case a truss framed of steel members. 8 and 9 are the posts, 10 and 11 the transverse guys. At 12 and 13 I have shown extensions of the crossarm 7, being rigidly fastened thereto, with a part 14 on the extension 12, for example, adapted to serve as a point of attachment for the guy 10. By using this device the position of the guy 10 is so changed as to leave sufficient clearance for the nearest conductor 6, as shown by the circle 15, which indicates the necessary air space required around the conductor. 45, 48 and 50 are members constituting parts of the extensions 12 and 13 and 49, 51 and 52 are members in the framing of the crossarm 7.

In a rigid construction the effect of this attaching of the guy to one side of the post instead of near the top would naturally be to cause a bending moment in the post, which it is the purpose of this invention to avoid. I, therefore, make the extension 12 a part of the truss 7 so that the bending due to the offset attachment of the guy is taken up by the truss 7. The only resultant effect of tension in the guy is to tend to raise the remote end of the truss without putting bending moment in either post. The effect on the members of the crossarm, which is designed to carry the weight and longitudinal loads, is such that the additional stresses due to the guy and extension 12 do not increase the size of the members, being usually in a direction the reverse of the stress due to the other loads.

I prefer to place a length adjusting device 16, such as a turnbuckle, in one or more guys to permit adjustment of position of the structure.

In Fig. 3 it is seen that, as shown, the posts 8 and 9 are in effect hinged for transverse motion at the top at 17 and at the bottom at 18, for the purpose outlined above, that is they are free to take angular displacements without introducing material bending moments.

In Fig. 4, however, it is noticed that the posts 8 and 9 while "hinged" for longitudinal motion at the bottom are not so hinged at the top. The exception to the "hinging" rule is introduced because it is desirable that the top truss or crossarm 7 be held rigidly in position as would not be the case were the posts "hinged" at the top for longitudinal motion. This, however, is not harmful for the only stress acting on this top, tending to produce bending moment is the wind stress due to the longitudinal component of wind on the upper part of the truss. The posts must be made strong enough to withstand these small stresses and the structure of Fig. 4 is so shown. The numerical amount of the added weight of material required is, however, relatively small.

In Fig. 4, 19 and 20 are longitudinal guys, connected to the structure near the top of the posts at 21. As in the case of Fig. 3, I may use length adjustment devices in the guys 19 and 20 shown at 16.

The crossarm or truss 7 and the posts 8 and 9 may be designed according to the well known rules for such structures.

In Fig. 2 and Fig. 4, I have shown only one of the longitudinal guys completely; the companion guy is similar to the one shown.

It should be noted, when designing actual structures, that the "hinging" effect or angular flexibility at the top and bottom of the posts need be given only a very limited latitude. That is, the actual motion to be expected in the crossarm with respect to the foundations, either transversely or longitudinally will be relatively slight and is merely sufficient to tighten up the guys or to take up any settling of foundations, etc., and advantage may be taken of this fact in design. The critical point is that the actual amount of motion which does occur shall not through the stiffness of the connection cause any material stress due to bending moment in the posts. It is well known that framed steel structures may be exceedingly stiff and any even slight angular motion will then introduce very great strains.

In Figs. 5 and 5ª I have shown in section a suitable guy anchor for taking up the tension on one of my longitudinal guys. 19 is the guy taking into the loop 23, which in turn is secured by nuts 24 to the channel 25. The earth at 26 against which the guy pulls should be undisturbed as far as may be feasible, so as to have the best resisting power for this purpose. The excavation is made at 27 behind the guy anchor. In any case, however, as the maximum stress in this guy is not excessive, refilled earth will serve for the anchor and a very inexpensive guy is secured.

Guys are now sometimes used in the art with such structures as that of prior art tower but are of little value for permitting a lightening of the necessary weight of the structure, because it is usually the fact that an excessive pull at the top would overstrain the tower due to its rigidity before the top could move far enough to the right to put a strain in the guy.

Sufficient flexibility may be obtained in my "guyed-post" tower even with the posts framed into the crossarm by rivets or bolts, thus leading to a simple and strong construction, provided the design be such as to permit the necessary small angular movement necessary to tighten up the guys without introducing stress. Such a design is indicated in Fig. 3.

In Fig. 6 I show one view of a tower adapted to carry two 3-wire circuits. The conductors are shown at 29, 29, 29 for one circuit and for the other 30, 30, 30. The crossarm is shown at 7 and the posts at 8 and 9. Transverse guys are shown at 31 and 32. These guys are attached to the crossarm 7 at the points 33, 33, which are on rigid extensions 34, 34 of the crossarm 7. These extensions take the pull of the guy and all the bending stress is taken up in the crossarm 7 leaving the posts free of bending.

In this structure, to secure the necessary insulation clearances, the conductor 29 placed outside of the post 9 is located a little further away from the post than would otherwise be necessary. This will ordinarily mean a small additional cost. In case that it should be desired for any reason, the alternative arrangement shown in Fig. 6ª may be used. In this figure 9ª is the post and the guy is attached to the post at 35. Furthermore, the guy passes a fulcrum point at 36 where it rests against the post member and is slightly deflected to maintain the clearance from the inside conductor 29. This construction throws a bending moment into the post 9ª, but one of moderate severity so that a very material benefit may still be obtained from the principles of this invention. In this case the post 9ª should be given an appropriate design, for example such as the one shown. In Fig. 6, as in Fig. 3, the transverse guys pass through the open spaces in the posts without being attached thereto.

It will be noticed that the insulator strings 41, 41 appropriate to the outside conductor 29 are more nearly vertical than the string 42, 42. This is to give more clearance for the extensions 34. The only effect is to produce a greater latitude of motion in the conductor 29 away from the post than toward it, which is of no disadvantage. By connecting the guys 31 and 32 at the point where they cross 46 I may control their direction of pull and still further improve the insulation clearance.

In Fig. 7 I have shown a tower for two 3-wire circuits having three posts, 43, 43, 43. In Fig. 7, 37, 37, 37 are the conductors of one circuit and 38, 38, 38 of the other. In this case all the conductors lie between the outside posts. The transverse guys 10 and 11 are attached to the extensions 13 at the points 14, all the bending due to the guy being taken up by the crossarms 39 and 40. Each of the three posts is provided with a pair of longitudinal guys attached to the crossarms at the head of the post as shown for Fig. 4, but are not shown in Fig. 7 for the purpose of clearness in the drawing. The middle post takes dead weight and the vertical component produced by the longitudinal guys, but no stress due to the transverse guys, except such upward stress as may be caused by the guys 10 and 11 acting on the extensions 13. Thus none of the three posts has any bending stress.

I have shown no longitudinal view of the structures of Figs. 6, 6ª and 7, but the construction is clear from the views given and from the previous figures. Post foundations for these three figures are shown at 44, 44, 44.

I have not shown any plan view of the lower chords of the crossarm trusses because the principles of design involved are well known to those skilled in the art.

Obviously my invention is not applicable to tower line structures in which non-rigid or highly flexible materials are used and where no effort is made to get minimum weights of material, unless in such structures the amounts of motion expected in the crossarm or the nature of the design is such that the bending moments produced in the posts thereby are serious.

It will be observed in Fig. 6 and Fig. 6ª, that should the outside insulator string 42 supporting the outside conductor 29 break, the conductor would still be supported out of contact with the post 8, and the system would continue to operate undisturbed. This will be often a great advantage in this particular method of hanging the insulator strings 41 and 42. The same arrangement may be used for the insulators supporting the other conductors where they are located next to a post so that in this case any insulator string in the system may break without interrupting service.

My invention has several practical advantages of great moment in addition to the important economy of material I secure. For example where the transmission line crosses uneven country it is necessary to adjust the length of the legs of the tower to the "lay" of the land. This is very easily done with my two posts, requiring only the lengthening of one or both posts and the necessary guys, while with the tower of the prior art, 4 legs are affected and any change in the leg lengths changes the bracing members in the towers, requiring many special designs. In the case of my towers it will often be found convenient to make the lower portion of all posts the same but to make the length of the upper portion to suit each location.

Again the tower of the prior art requires very deep and heavy foundations as there may be a strong uplift on them due to the leverage of the stress A. Any uplift in my posts or guys will be small and cared for at small cost.

Furthermore, any sinking of foundations or small irregularity of placement in installation cannot cause any material stress in my tower, while in the tower of the prior art any relative movement in the position of the foundations must throw very dangerous strains into the tower members.

My construction has other advantages that will appear to those skilled in the art as cases arise.

Many of the advantages of my invention may be secured by various constructions and it is by no means necessary to have an actual hinge at the top or bottom of the posts, it is merely necessary to have such a construction that the structure will be freed from the bending stresses due to movement of the crossarm 4 or due to the loading stresses which are taken up by the guys and that this be done by the equivalent of the angular flexibility of the connection of the posts with the foundations and the crossarm truss.

Attention is called to the fact that the point of attachment of all the guys is important and should be substantially as shown or its mechanical equivalent.

I have shown the transmission conductors at 6, 6, as supported each by two strings of insulators shown at 22, 22, 22, 22, hung at a considerable angle with one another. This serves to prevent side swinging of the conductors and hence permits a much closer spacing horizontally than would otherwise be the case. It has the further advantage of permitting free swinging of the insulator string longitudinally. I may of course, use the usual types of insulators if so desired.

My tower is favorably designed for the use of overhead ground wires such as are customary in transmission lines, provided the ground wires are connected to the cross arm in such a manner as not to produce bending in the posts, for example, by connection to the posts at 17, 17, and 28.

In a second application filed concurrently with this application I have made claim to certain features shown in this application.

I claim as my invention:

1. A transmission line tower, comprising a rigid crossarm extending transversely of the line, attachment points for conductor supporting insulators spaced apart and lying in one plane on said crossarm, rigid posts near the ends of said crossarm taking the vertical load of said crossarm, means for resisting longitudinal and tortional stresses on said crossarm caused by one or more broken conductors, said means consisting of pairs of guys for each post extending in the direction of the line and attached to said crossarm in the plane of said insulator attachment points, means for resisting transverse stresses on said cross-arm, said means consisting of an internal guy for each post attached to said cross arm at a point below the point of attachment of said longitudinal guys, said crossarm being proportioned to take up the resulting bending moment and means for eliminating bending moment in said posts due to maladjustments of said said members and accidental yielding of said guys, said means consisting of connections between said posts and said crossarm, flexible for motion of the crossarm across the line.

2. A transmission line tower, comprising a rigid crossarm extending transversely of the line, attachment points for conductor supporting insulators spaced apart and lying in one plane on said crossarm, rigid posts near the ends of said crossarm taking the vertical load of said crossarm, means for resisting longitudinal and torsional stresses on said crossarm caused by one or more broken conductors, said means consisting of pairs of guys for each post extending in the direction of the line and attached to said crossarm in the plane of said insulator attachment points, means for resisting transverse stresses on said crossarm, said means consisting of an internal guy for each post attached to said crossarm at a point below the point of attachment of said longitudinal guys, said crossarm being proportioned to take up the resulting bending moment, foundations under said posts, and means for eliminating bending moment in said posts due to maladjustments of said members and accidental yielding of said guys, said means consisting of connections between said posts and said crossarm, flexible for motion of the crossarm across the line, and flexible connections between said foundations and said posts.

3. In a transmission line tower, a rigid crossarm carrying a series of insulator attachment devices lying in the same plane, longitudinal guys in pairs attached to said crossarm in said plane, thus taking up longitudinal stresses in said attachment devices without resultant bending moments, internal transverse guys, attached to extensions on said crossarm at points near the ends of said crossarm below said plane, said extensions being proportioned to take the bending moment in a vertical plane caused by stresses across the line at said attachment devices, posts near the ends of said crossarm directly under the points of attachment of said longitudinal guys, taking the dead weight on said crossarm and the vertical components of stresses in said guys, foundations for said posts and connections for said posts, flexible for displacements of said crossarm due to settlement of foundations, accidental yielding of guys and maladjustments of guys in erection.

4. A double circuit transmission line tower comprising a rigid crossarm, six attachment devices for insulator strings thereon, two posts for taking up vertical stresses to support said crossarm and connected thereto between the first and second attachment devices at each end; longitudinal and transverse guys for taking up horizontal stresses impressed on said crossarm, means for attaching said guys to said crossarm between said first and second attachment devices and flexible mechanical connections for said posts.

5. A transmission line tower comprising a rigid crossarm carrying conductor supporting insulator strings having their points of attachment in one horizontal plane, longitudinal guys in pairs near the ends of said crossarm attached to said crossarm in said plane on the center line for taking up the longitudinal stresses on said insulator strings without causing resultant bending moment, posts adapted for bearing direct compression located under the points of attachment of said longitudinal guys, internal transverse guys each attached to the bottom of one post and passing below the air space clearance of the insulator strings, connecting means for said guy for transferring the stress therein, together with its bending moment, to the crossarm, and mechanical connections between said posts and said crossarm, yielding without material resistance to displacements of said crossarm from the normal due to settling of foundations and inaccuracies of installation.

6. A transmission line tower for six conductors, comprising a rigid crossarm, insulator strings for six conductors attached thereto, all attached to the crossarm in the same plane, two posts set approximately vertical under said crossarm, there being insulator strings for four conductors between the posts and one outside each post and longitudinal and internal transverse guys therefor all attached to said crossarm between the same insulator strings as the posts, the longitudinal guys being attached in the same horizontal plane as the insulators and the transverse guys passing below the insulation air space clearance of the four central insulator strings, together with foundations for said posts and flexible connections between said foundations and said crossarm and said posts.

7. A transmission line tower, comprising an inverted U-shaped bridge, including two supporting vertical post portions and an overhanging cross arm portion, rigidly framed, a series of conductor attachment devices on the crossarm portion of said bridge, all lying in one plane, flexible foundations for said bridge, means for resisting the overturning moment around said foundations and the torsional stresses on said bridge due to a broken conductor, said means consisting of longitudinal guys in pairs connected at the top of each vertical post portion and in the plane of said attachment devices, means for taking up transverse stresses comprising internal crossed guys attached to said crossarm, and means for avoiding the development of bending stresses in said vertical post portion due to transverse motion of said crossarm portion from settling of foundations, yielding of guys and maladjustments during erection, said means including elements in the framing between said crossarm portion and said post portions, flexible for motion across the line.

8. A transmission line support comprising a rigid crossarm framed of structural elements and extending across the line, insulator support points on said crossarm lying in a row and located in one plane on said crossarm, longitudinal guys connected in pairs near both ends of said crossarm, the points of connection lying in the same line and in the same plane as said insulator support points, inside transverse guys, passing below the insulation clearance space underneath said crossarm and terminating below the plane of said insulator support points, and means for transferring the stresses due to each transverse guy, including bending moments to said crossarm, said means including a rigidly framed extension below said crossarm, together with a narrow base post for supporting each end of said crossarm.

9. A transmission line tower, comprising a rigid cable carrying crossarm extending across the line and having a plane of resistance for longitudinal stresses, points of support on said crossarm for said cables lying in said plane of resistance, means for resisting unbalanced longitudinal stresses developing on said tower from said cables, said means being attached to said crossarm in said plane of resistance, posts under said crossarm, near the ends and separate means attached to said crossarm at points lying below said plane of resistance for resisting transverse stresses developing on said tower.

10. A transmission line tower, comprising a rigid cable carrying crossarm extending across the line and having a plane of resistance for longitudinal stresses, points of support on said crossarm for said cables lying in said plane of resistance, means for resisting unbalanced longitudinal stresses developing on said tower from said cables, said means being attached to said crossarm in said plane of resistance, separate posts supporting said crossarm near the ends, said posts being connected to said crossarms at points below said plane of resistance and means for resisting transverse stresses developing in said crossarm, said means being attached to said tower at the point of connection between said posts and said towers.

Signed at New York, in the county of New York and State of New York this 9th day of October, A. D. 1925.

PERCY H. THOMAS.